May 17, 1966
T. T. TRUE
3,251,930
COLOR-SYNCHRONIZING SIGNAL CIRCUIT
FOR A COLOR TELEVISION RECEIVER
Filed Nov. 27, 1962
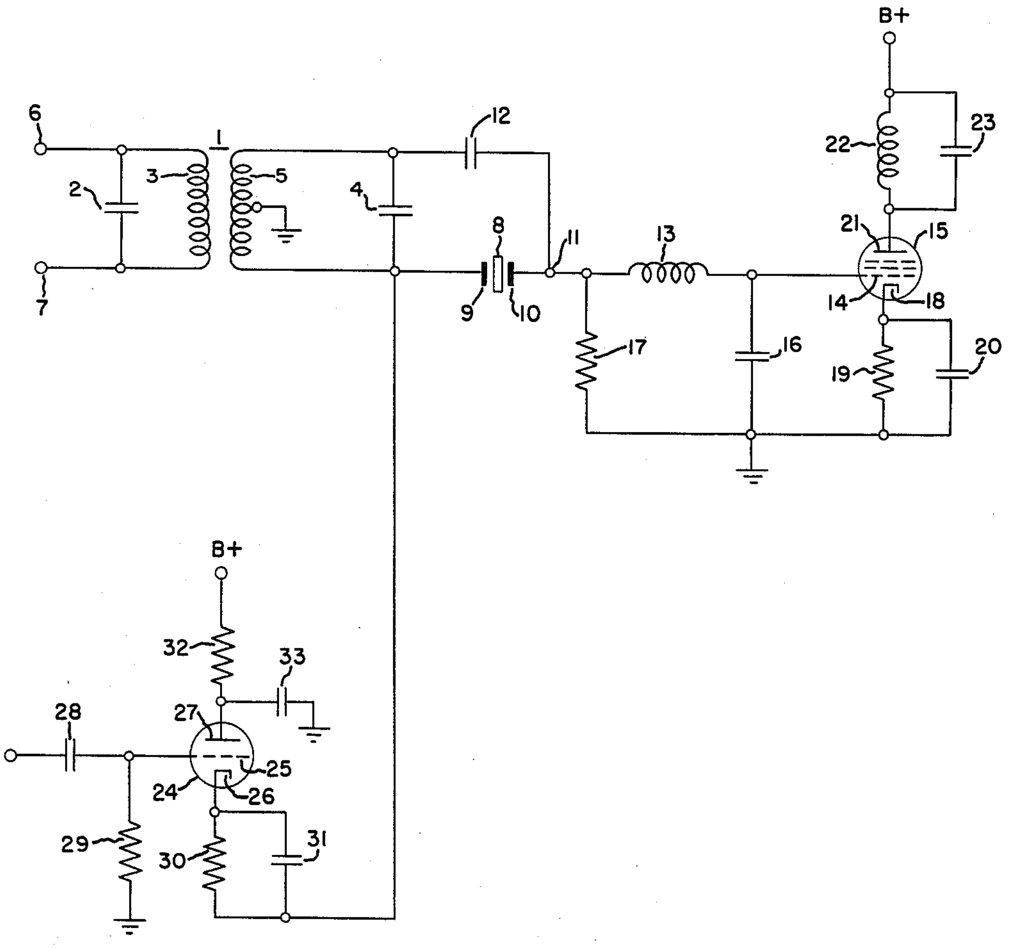
INVENTOR:
THOMAS T. TRUE,
BY Frank J. Thompson
HIS ATTORNEY.

3,251,930
Patented May 17, 1966

3,251,930

COLOR-SYNCHRONIZING SIGNAL CIRCUIT FOR A COLOR TELEVISION RECEIVER

Thomas T. True, Camillus, N.Y., assignor to General Electric Company, a corporation of New York Filed Nov. 27, 1962, Ser. No. 240,286
5 Claims. (Cl. 178—5.4)

This invention relates to color television receivers and, in particular, to a circuit for deriving the reference wave for the color subcarrier of the received video signal to enable recovery of the color information.

In the standard color television system, the transmitted video signal includes a brightness signal, similar to the brightness signal transmitted in black-and-white television, a color subcarrier, the usual horizontal and vertical synchronizing pulses and blanking pulses and bursts of at least eight cycles of the color subcarrier frequency at a standard phase following each of the horizontal synchronizing pulses. The color subcarrier is phase modulated in accordance with hue and amplitude modulated in accordance with the purity of the color or its degree of saturation. In the receiver, the color information is recovered from the color subcarrier by means of a phase and amplitude detector arrangement. The quality of reproduction in the receiver is dependent upon the provision of a reference wave having a frequency identical with the frequency of the subcarrier and the same phase as the subcarrier. This reference wave is derived in the receiver from the bursts following the horizontal synchronizing pulses.

Prior art color television receiver circuits have employed crystal filters to derive the reference wave. Various crystal filters suitable for this purpose may be found in U.S. Patent 2,908,877, issued October 13, 1959, entitled "Crystal Filter" and U.S. Patent 2,910,657, dated October 27, 1959, and entitled "Crystal Filter," both assigned to the assignee of the present invention. The circuits disclosed in these patents provide means for driving one side of a crystal and employ a suitable terminating network coupled to the other side of the crystal. The terminating network for the crystal generally includes a series resonant circuit comprising an inductor and a capacitor, the voltage appearing across the capacitor being coupled to the grid of an amplifier. The crystal filter, which is driven during the burst period and which, because of its high Q, continues to ring during the interval between bursts, effectively blocks all side band components of the burst, while passing the continuous wave of the reference frequency.

It is desirable that the amplitude of the reference wave output of the crystal filter be maintained at a relatively constant level during the line periods and during the vertical synchronizing periods in order to obviate limiting following the filter. To minimize decay of the reference signal amplitude between burst periods, a crystal filter Q in the order of 16,000 to 32,000 in required. However, crystal filter Q's of this magnitude cause phase shifts of the reference wave at the filter output as the transmitted burst frequency varies between the allowable limits, thereby producing errors in the hue of the reproduced image. In order to preserve picture quality, it is therefore necessary to limit the Q of the crystal filter to approximately 8,000 or less.

Thus, the requirement that the Q of the crystal filter in the color television receiver be high in order to provide a uniform amplitude reference signal conflicts with the requirement of a low Q crystal filter to minimize variations in the phase of the reference wave due to changes in the burst frequency and to preserve picture quality. By the present invention, the conflicting requirements as to the Q of the crystal filter are satisfied by altering the Q of the filter in synchronism with the burst periods of the received color television signal.

It is an object of the invention to provide an improved circuit for deriving the reference wave from the received color-synchronizing bursts in a television receiver.

It is another object of the invention to provide a circuit for deriving the reference wave from the received color-synchronizing bursts in a television receiver wherein the reference wave output is of substantially constant amplitude during the line and vertical synchronization periods, and wherein the phase changes of the reference wave output in response to variations of the burst frequency are minimized.

Briefly stated, in accordance with the illustrated embodiment of the invention, the Q of a crystal filter, including a driving circuit and a terminating network, is rendered variable by connecting the filter to a variable resistance device in the form of an electron discharge device, which effectively shunts the driving circuit. The conductivity of the electron discharge device is controlled by a pulse train which is synchronized with the color bursts of the received video signal, the electron discharge device being non-conductive during the burst period when the crystal-filter is being driven and conductive during the ringing period, i.e. during the line or vertical synchronization period.

The subject matter of the invention is particularly pointed out and distinctly claimed in the concluding portion of the specification. The invention, however, both as to organization and method of operation may best be understood by reference to the following description taken in connection with the accompanying drawing, the single figure of which illustrates the synchronously variable Q crystal filter of the invention.

With reference to the drawing, the crystal filter, which is resonant at the color subcarrier and color burst frequency, includes a driving circuit comprising a double-tuned transformer 1 having a capacitor 2 connected across its primary winding 3 and a capacitor 4 connected across its bifilar secondary winding 5. The color-synchronizing burst gated from the demodulated video signal output of the second detector is applied to terminals 6 and 7 for energization of primary winding 3 during the burst period.

A crystal 8, contained within the usual holders 9 and 10, is connected to the driving circuit, holder 9 being connected to a terminal of secondary winding 5, while holder 10 is connected to a circuit point 11. Neutralization of the capacitance of the holders 9 and 10 is effected by capacitor 12 connected between circuit point 11 and the other terminal of secondary winding 5.

The terminating circuit of the crystal filter comprises an inductance 13 connected between circuit point 11 and the control grid 14 of amplifier 15, and a capacitor 16 connected between control grid 14 and ground. The values of inductor 13 and capacitor 16 may be selected to provide a series resonant circuit at the desired signal frequency in order to provide a low output impedance for the crystal 8. A grid-leak resistor 17 is connected between circuit point 11 and ground. Cathode electrode 18 of amplifier 15 is connected to ground through a biasing resistor 19 and a bypass capacitor 20, while anode electrode 21 is connected to D.C. supply through inductor 22, which is bypassed by a capacitor 23.

Variation of the Q of the crystal filter is effected by electron discharge device 24 having a control grid electrode 25, a cathode electrode 26, and an anode electrode 27. A control signal, in the form of a pulse train, is applied to control grid 25 through coupling capacitor 28, control grid 25 being connected to ground through grid-leak resistor 29. The control signal for electron discharge device 24 may be the signal which is employed in the receiver to gate the color bursts from the video signal. Cathode 26 of electron discharge device 24 is connected to holder 9 of crystal 8 through resistor 30 which is shunted by capacitor 31. Anode 27 is connected to a D.C. potential source through resistor 32 while capacitor 33 is connected between anode 27 and ground.

In operation, the color burst portion of the composite video signal is separated therefrom by a gate, termed a burst keyer, which is open only during the part of the back-porch of the horizontal synchronizing pulse when the color bursts are present. The separated color bursts are applied to the driving circuit of the crystal filter at terminals 6 and 7 for excitation of crystal 8, which is selected to be resonant at the burst frequency. The components of the driving circuit of the crystal filter are chosen so that the driving circuit impedance is of sufficient magnitude to limit the Q of the crystal filter to approximately 8,000 or less, in order to minimize phase shift of the reference signal as the burst frequency changes. During the period in which the burst signal is being applied to terminals 6 and 7 of the driving circuit, a negative pulse, coincident in time with the burst, is applied to control grid 25 of electron discharge device 24 to bias device 24 to a non-conductive state. Thus, the impedance of device 24 is high and, since device 24 effectively shunts the driving circuit of the crystal filter, the impedance introduced by the driving circuit into the crystal filter remains high.

Upon termination of the burst and hence termination of the driving period of the crystal filter, the control signal for discharge device 24, which is synchronized with the application of the color bursts to terminals 6 and 7, renders device 24 conductive and effectively shunts the driving circuit with a low impedance during the ringing period of the crystal filter, thereby increasing the Q of the filter to the desired range of 16,000 to 32,000, in order to minimize amplitude decay of the reference wave during the ringing period.

Device 24 thus serves as a variable dynamic impedance shunting the driving circuit, permitting the driving circuit to have a high impedance during the burst period and shunting the driving circuit with a low impedance during the ringing period to achieve the desired conditions of low driving Q and high ringing Q.

Although the invention and its operation has been described with reference to its specific embodiment, the invention is not to be limited to this embodiment. Many modifications will be obvious to those skilled in the art. For example, any non-linear element, e.g. a diode, may be utilized to control the Q of the crystal filter in synchronism with the application of the color bursts. It is thus intended in the appended claims to claim all such variations as fall within the true spirit and scope of the invention.

What is claimed as new and desired to be secured by Letters Patent of the United States is:

1. In a color television system employing horizontal blanking and synchronizing pulses and color-synchronizing bursts superimposed thereon, (a) a low Q oscillatory circuit tuned to the burst frequency for deriving a reference wave of substantially the same phase and frequency as the oscillations of the color-synchronizing bursts and for minimizing phase-shift of the reference wave in response to burst frequency change;
(b) means for applying said color-synchronizing bursts to said oscillatory circuit; and
(c) means for substantially increasing the Q of said oscillatory circuit during the intervals between applications of said bursts to said oscillatory circuit to minimize amplitude decay of said reference wave during these intervals whereby a substantially constant amplitude reference wave is provided at the output of said oscillatory circuit.

2. The color television system of claim 1 in which said last-named means comprises a variable impedance device connected to said oscillatory circuit.

3. The color television system of claim 1 in which said last-named means comprises an electron discharge device connected to said oscillatory circuit and includes a bias means for rendering said electron discharge device nonconductive during application of said bursts to said oscillatory circuit and conductive during the intervals therebetween.

4. The color television system of claim 1 in which said oscillatory circuit comprises a crystal filter.

5. In a color television system employing horizontal blanking and synchronizing pulses and color-synchronizing bursts superimposed thereon;
(a) a low Q crystal filter tuned to the burst frequency for deriving a reference wave of substantially the same phase and frequency as the oscillations of the color-synchronizing bursts and including a high impedance driving circuit which renders the Q of the filter circuit low to minimize phase-shift of the reference wave in response to burst frequency change;
(b) means for applying said color-synchronizing bursts said crystal filter; and
(c) control means for substantially increasing the Q of said crystal filter during the intervals between applications of said bursts to said crystal filter to minimize amplitude decay of the reference wave during these intervals whereby a reference wave of substantially constant amplitude is available at the crystal filter output, said control means comprising an electron discharge device shunting the driving circuit of said crystal filter and including a bias means for rendering said electron discharge device non-conductive during application of said bursts to said crystal filter and conductive during the intervals therebetween.

References Cited by the Examiner

UNITED STATES PATENTS

| | | | |
|---|---|---|---|
| 2,712,568 | 7/1955 | Avins et al. | 178—5.4 |
| 2,910,657 | 10/1959 | True | 178—5.4 X |

DAVID G. REDINBAUGH, *Primary Examiner.*

ROBERT SEGAL, *Examiner.*